United States Patent

Banno

(10) Patent No.: US 9,961,150 B2
(45) Date of Patent: May 1, 2018

(54) NON-TRANSITORY COMPUTER-READABLE STORAGE MEDIUM STORING INSTRUCTIONS FOR INFORMATION PROCESSING DEVICE, INFORMATION PROCESSING DEVICE, AND METHOD FOR CONTROLLING INFORMATION PROCESSING DEVICE

(71) Applicant: Brother Kogyo Kabushiki Kaisha, Nagoya-shi, Aichi-ken (JP)

(72) Inventor: Katsura Banno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 437 days.

(21) Appl. No.: 14/584,429

(22) Filed: Dec. 29, 2014

(65) Prior Publication Data

US 2015/0189025 A1 Jul. 2, 2015

(30) Foreign Application Priority Data

Dec. 27, 2013 (JP) .................................. 2013-271751

(51) Int. Cl.
*G06F 15/173* (2006.01)
*H04L 29/08* (2006.01)
(Continued)

(52) U.S. Cl.
CPC ............ *H04L 67/16* (2013.01); *G06F 3/1204* (2013.01); *G06F 3/1226* (2013.01);
(Continued)

(58) Field of Classification Search
CPC .. G06F 3/04842; G06F 3/1226; G06F 3/1292; G06F 3/1204; G06F 3/1236;
(Continued)

(56) References Cited

U.S. PATENT DOCUMENTS 7,769,837 B2 * 8/2010 Nogawa .............. H04L 41/0806
709/228
9,059,869 B2 * 6/2015 Xue .................... H04L 12/5692
(Continued)

FOREIGN PATENT DOCUMENTS

| EP | 1450515 A2 | 8/2004 |
| JP | 2005-031713 A | 2/2005 |
| JP | 2007-213363 A | 8/2007 |
| JP | 2012-175614 A | 9/2012 |

OTHER PUBLICATIONS

Feb. 7, 2017—(JP) Notification of Reasons for Rejection—App 2013-271751, Eng Tran.
Jun. 9, 2015—(EP) Extended EP Search Report—App 14200341.7.

*Primary Examiner* — Liangche A Wang
*Assistant Examiner* — Ayele Woldemariam
(74) *Attorney, Agent, or Firm* — Banner & Witcoff, Ltd.

(57) ABSTRACT

An information processing device may search for a communicable communication device which is a communication device capable of communication. The information processing device may display, in a case that a communicable communication device is detected, a device image and an interface image associated with each other on a display unit of the information processing device. The device image may indicate the detected communicable communication device. The interface image may indicate the communication interface corresponding to the detected communicable communication device. The information processing device may display, in a case that a plurality of communicable communication devices is detected, a plurality of device images corresponding to the plurality of detected communicable communication devices and a plurality of interface images corresponding to the plurality of detected communicable communication devices in one display screen on the display unit.

14 Claims, 8 Drawing Sheets

(51) Int. Cl.
*H04L 12/26* (2006.01)
*G06F 3/12* (2006.01)
*H04W 4/00* (2018.01)
*H04W 84/12* (2009.01)
*H04W 84/18* (2009.01)

(52) U.S. Cl.
CPC .......... *G06F 3/1236* (2013.01); *G06F 3/1292* (2013.01); *H04L 43/10* (2013.01); *H04W 4/008* (2013.01); *H04W 84/12* (2013.01); *H04W 84/18* (2013.01)

(58) Field of Classification Search
CPC ........ H04L 43/10; H04L 67/16; H04W 4/008; H04W 84/12; H04W 84/18
See application file for complete search history.

(56) References Cited

U.S. PATENT DOCUMENTS

| | | |
|---|---|---|
| 2005/0007617 A1 | 1/2005 | Tanaka et al. |
| 2005/0055379 A1* | 3/2005 | Yamazaki ............ G06Q 10/107 707/999.107 |
| 2009/0091779 A1* | 4/2009 | Ishinaga ................. B41J 2/175 358/1.15 |
| 2011/0019228 A1* | 1/2011 | Uchikawa ............ G06F 3/1204 358/1.15 |
| 2011/0080910 A1* | 4/2011 | Shouno .................. H04L 12/18 370/390 |
| 2012/0218918 A1 | 8/2012 | Takae et al. |
| 2013/0258399 A1* | 10/2013 | Nanaumi ............ G06K 15/405 358/1.15 |

* cited by examiner

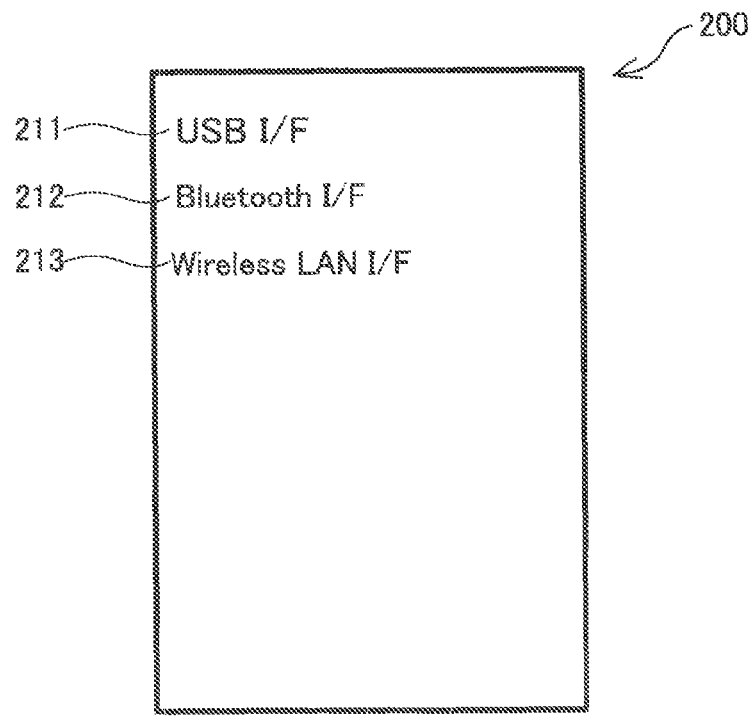
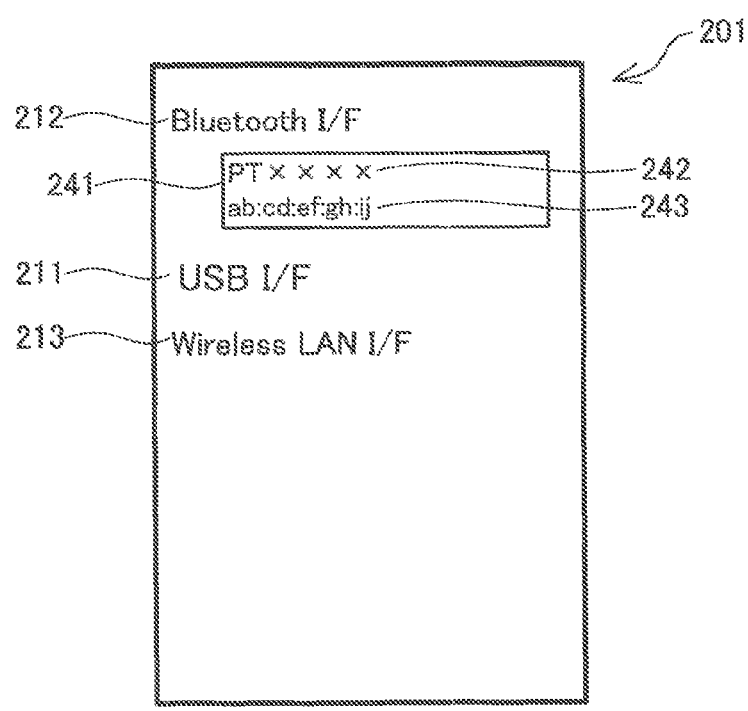

NON-TRANSITORY COMPUTER-READABLE STORAGE MEDIUM STORING INSTRUCTIONS FOR INFORMATION PROCESSING DEVICE, INFORMATION PROCESSING DEVICE, AND METHOD FOR CONTROLLING INFORMATION PROCESSING DEVICE

CROSS-REFERENCE TO RELATED APPLICATION

This application claims priority to Japanese Patent Application No. 2013-271751, filed on Dec. 27, 2013, the contents of which are hereby incorporated by reference into the present application.

TECHNICAL FIELD

The technique disclosed herein relates to a connection managing program for communicating with a communication device, an information processing device, and a method for controlling the information processing device.

DESCRIPTION OF RELATED ART

A mobile terminal device capable of performing a communication with a wireless communication device is known. The mobile terminal device executes a search process to find a wireless communication device in the vicinity in response to an application being started. Further, a display screen is generated that includes an image indicating the wireless communication device that was found, and the selection of the wireless communication device is received. Then, a wireless communication is performed with the selected wireless communication device.

SUMMARY

The present specification discloses a technique that allows an information processing device to appropriately perform a wireless communication of target data with a communication device.

One technique disclosed in the present application is a non-transitory computer-readable storage medium storing instructions for an information processing device. The information processing device may comprise: a plurality of communication interfaces configured to communicate with various types of networks using different communication protocol; a display unit; and a processor coupled to the plurality of communication interfaces. The instructions, when executed by the processor, may cause the information processing device to perform searching, for each of at least two communication interfaces among the plurality of communication interfaces, for a communicable communication device being a communication device that can be communicated by the communication interface. The instructions may cause the information processing device to perform displaying, in a case that a communicable communication device is detected by the searching, a device image and an interface image associated with each other on the display unit of the information processing device. The device image may indicate the detected communicable communication device. The interface image may indicate the communication interface corresponding to the detected communicable communication device. The displaying may include displaying, in a case that a plurality of communicable communication devices is detected by the searching, a plurality of device images corresponding to the plurality of detected communicable communication devices and a plurality of interface images corresponding to the plurality of detected communicable communication devices in one display screen on the display unit.

BRIEF DESCRIPTION OF THE DRAWINGS

FIG. 6 shows a screen example of a communication interface selection screen;
and
FIGS. 7 to 11 show screen examples of a communication interface selection screen.

DETAILED DESCRIPTION

Structure of Network 10

Figure 1:
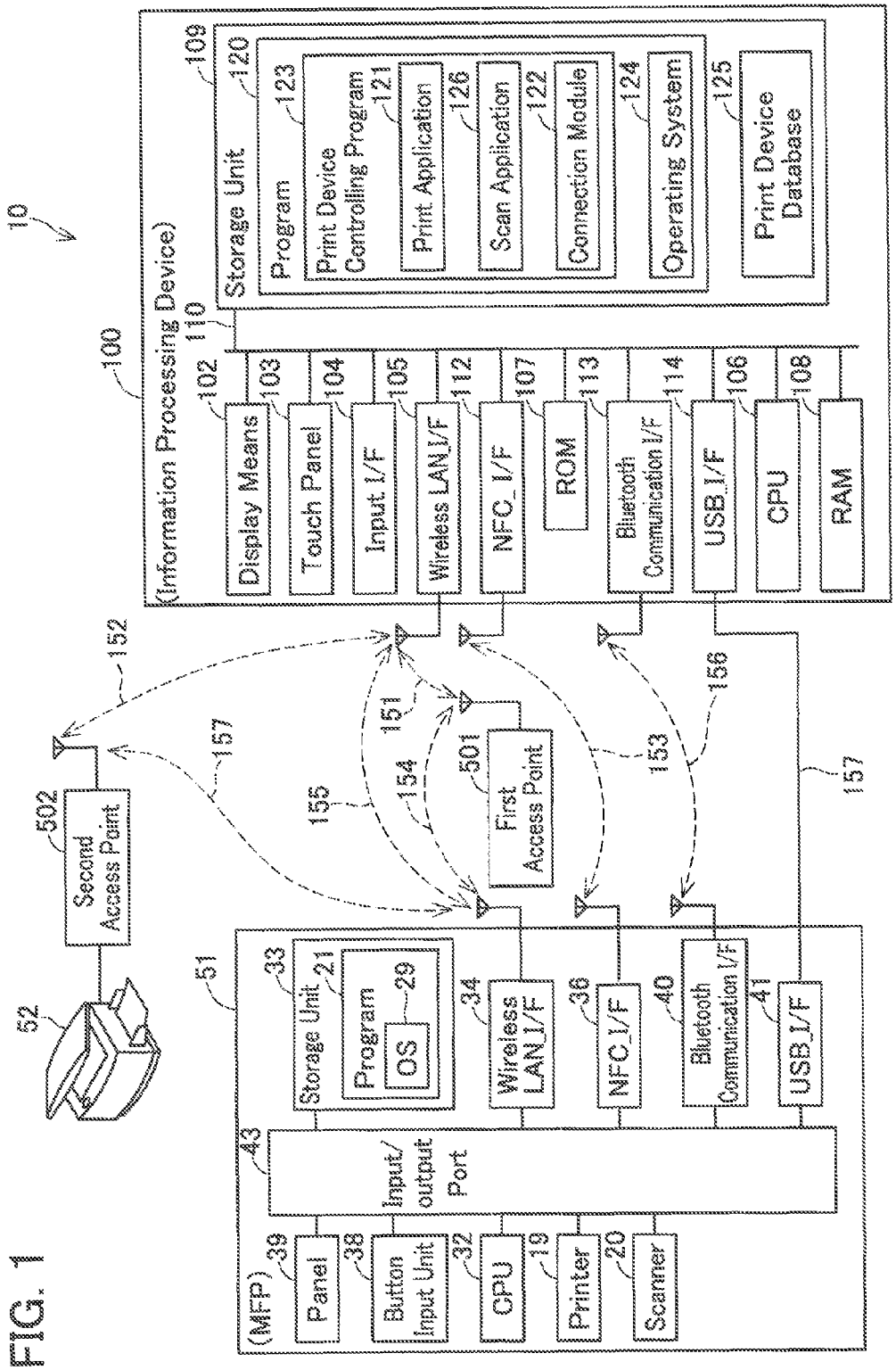
FIG. 1 shows a configuration of a communication system.
Figure 2:
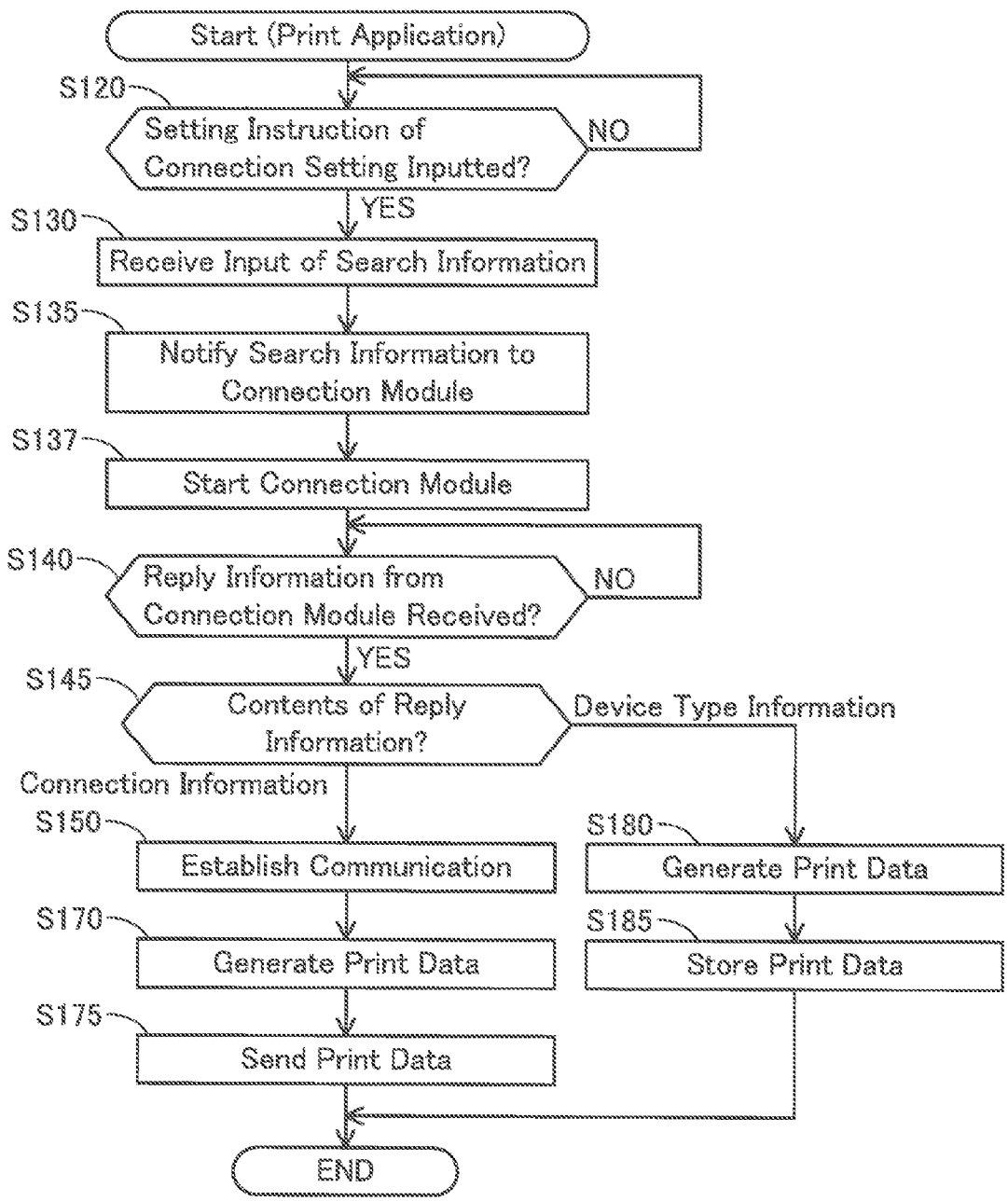
FIGS. 2 to 5 show flowcharts of processes by a CPU of an information processing device.

FIG. 1 is a block view showing the structure of a network 10. The network 10 comprises an information processing device 100, MFPs 51 and 52, a first access point 501, and a second access point 502. Here, MFP indicates a multifunction peripheral device (also called Multifunction Peripheral) comprising a print function, scan function, and copy function.

An NFC communication I/F (abbreviation of InterFace. Same below.) 112 of the information processing device 100 can perform a communication with an NFC communication I/F 36 of the MFP 51 via an NFC (abbreviation of Near Field Communication) protocol wireless communication 153. In the present embodiment, wireless communication is performed according to the NFC protocol based on International Standard ISO/IEC 21481 or 18092.

A wireless LAN_I/F 105 of the information processing device 100 is an I/F that functions as an infrastructure mode wireless LAN_I/F and a WFD_I/F. The infrastructure mode wireless LAN_I/F can communicate with the MFP 51 by performing infrastructure mode wireless communications 151 and 154. Further, the infrastructure mode wireless LAN_I/F can communicate with the MFP 52 by performing an infrastructure mode wireless communication 152. Further, the wireless LAN_I/F 105 can directly perform a communication with the wireless LAN_I/F 34 of the MFP 51 via a WiFi Direct® (registered trademark of Wi-Fi Alliance. referred to as WFD below) protocol wireless communication 155. That is, the information processing device 100 can construct a WFD network by establishing a connection with the MFP 51 in accordance with the WFD protocol. In WFD, wireless communication is performed based on the standard of 802.11 of IEEE (abbreviation of The Institute of Electrical and Electronics Engineers, Inc.), and a standard (e.g., 802.11a, 11b, 11g, or 11n) equivalent to this standard.

Further, a Bluetooth® (registered trademark of Bluetooth SIG Inc. Same below.) communication I/F 113 of the information processing device 100 can perform a communication with a bluetooth communication I/F 40 of the MFP 51 via a bluetooth protocol wireless communication 156. Further, a USB_I/F 114 of the information processing device 100 can perform a communication with a USB_I/F 41 of the MFP 51 via a USB cable 157.

Each of the first access point 501 and the second access point 502 has an SSID (abbreviation of Service Set Identifier). The SSID is a name for identifying each of the first access point 501 and the second access point 502. By executing a print device controlling program 123, the information processing device 100 can send print data to the MFPs 51 and 52 via a communication using the wireless LAN_I/F 105, the bluetooth communication I/F 113, and the USB_I/F 114.

(Structure of Information Processing Device 100)

The information processing device 100 is a portable device such as a mobile phone or a portable terminal device. The information processing device 100 comprises a display means 102, a touch panel 103, an input I/F 104, the wireless LAN_I/F 105, the NFC I/F_112, the bluetooth communication I/F 113, USB_I/F 114, a CPU (abbreviation of Central Processing Unit) 106, a ROM (abbreviation of Read Only Memory) 107, a RAM (abbreviation of Random Access Memory) 108, a storage unit 109, etc., which are connected with one another via an input/output port 110.

The display means 102 receives an image signal output from the CPU 106, and displays an image based on the received image signal. An LCD, an organic EL panel, etc. may be used as the display means 102. The touch panel 103 is formed of a transparent member, and is disposed so as to cover a surface of the display means 102. The touch panel 103 detects a position touched by the finger or the like of the user, and outputs detected position information to the CPU 106. The input I/F 104 is, e.g., an operation button.

The NFC_I/F 112 is an interface for performing the NFC protocol wireless communication 153. Various information for communication settings (e.g., IP address, SSID, etc.) are not required in order to establish the NFC protocol wireless communication 153. The wireless LAN_I/F 105 is an interface for performing wireless LAN protocol wireless communications 151, 152, 155. A communicable distance of the wireless LAN protocol wireless communications 151, 152, 155 is greater than a communicable distance of the NFC protocol wireless communication 153. Further, a communication speed of the wireless LAN protocol wireless communications 151, 152, 155 is faster than a communication speed of the NFC protocol wireless communication 153. The bluetooth communication I/F 113 is an interface for performing the bluetooth protocol wireless communication 156. The USB_I/F 114 is an interface for performing a wired communication via the USB cable 157.

The CPU 106 executes programs stored in the storage unit 109. The RAM 108 temporarily stores information needed for the processes of the CPU 106. The storage unit 109 is configured such that a flash memory, HDD (abbreviation of Hard Disk Drive), and a buffer or the like provided in the CPU 106, are combined. Image data, document data, etc. can be stored in the storage unit 109.

Further, the storage unit 109 stores a print device database 125. The print device database 125 stores, for each type of print device, a communication interface with which the print device is installed. For example, device type identification information for identifying the type of print device and the installed communication interface may be stored in association in the print device database 125. As a specific example, the information may be stored in the print device database 125 that a print device having model name X is installed with a wireless LAN_I/F, and a print device having model name Y is installed with a wireless LAN_I/F and an NFC I/F.

Further, the storage unit 109 stores a program 120. The program 120 includes a print device controlling program 123, and an operating system 124 (referred to as OS 124 below). The print device controlling program 123 includes a print application 121, a scan application 126, and a connection module 122. The CPU 106 executes processes in accordance with the program 120. Hereafter, the CPU 106 executing a program such as the print application 121, the connection module 122, the OS 124, etc. may be described simply by the program name. For example, the description "the print application 121" may mean "the CPU 106 that executes the print application 121".

The print device controlling program 123 is a program for controlling various print devices such as the MFPs 51 and 52. The print application 121 is an application for sending the print data from the information processing device 100 to the MFP 51, the MFP 52, or the like, and causing the MFP 51, the MFP 52, or the like to perform a print process. The scan application 126 is an application for sending a scan executing instruction from the information processing device 100 to the MFPs 51 and 52, etc., and receiving scan data from the MFPs 51 and 52, etc. Moreover, in the present embodiment, a case where the print application 121 is used will be described. A description of the operation contents of the scan application 126 is omitted.

The connection module 122 is a program that executes a process to connect the information processing device 100 with various networks via a wireless communication. The connection module 122 may be a program that is called and executed in various applications such as the print application 121 and the print application 121, or the like. That is, the connection module 122 may function as a lower-level application that provides a communication function to a higher-level application (e.g., the print application 121 and the scan application 126) that provides a function close to the user.

The OS 124 is a program that provides a basic function of which use is shared by the print application 121, etc. In the present embodiment, a case is described in which the OS 124 is an Android® (registered trademark of Google Inc.) OS. The OS 124 includes a program for causing the wireless LAN_I/F 105, the NFC_I/F 112, and the bluetooth communication I/F 113 to perform a wireless communication. Further, the OS 124 is also a program that provides an API (abbreviation of Application Programming Interface) for each program to acquire information acquired by hardware, or for each program to instruct various hardware.

(Structure of MFP 51)

The structure of the MFP 51 will be described. The MFP 51 mainly comprises a CPU 32, a storage unit 33, the wireless LAN_I/F 34, the NFC_I/F 36, the bluetooth communication I/F 40, USB I/F 41, a button input unit 38, a panel 39, a printer 19, and a scanner 20. These structural elements are capable of communicating with one another via an input/output port 43.

The CPU 32 executes a program 21 stored in the storage unit 33. The storage unit 33 is configured such that a RAM, ROM, flash memory, HDD, and a buffer or the like provided in a CPU 32 are combined. The storage unit 33 stores the program 21. The program 21 includes an OS 29, etc.

The wireless LAN_I/F 34 is an interface for performing infrastructure mode wireless communications 154 and 157, and the WFD protocol wireless communication 155. The bluetooth communication I/F 40 is an interface for performing the bluetooth protocol wireless communication 156. The USB_I/F 41 is an interface for performing a wired communication via the USB cable 157. The NFC communication I/F 36 is an interface for performing a wireless communication 153 in accordance with the NFC protocol for so-called short distance wireless communication.

The button input unit 38 is a key to perform the functions of the MFP 51. The button input unit 38 may be configured integrally with the panel 39 as a touch panel. The panel 39 displays various function information of the MFP 51. The printer 19 is a member that executes a print process using image data stored in the storage unit 33. The scanner 20 is a member that executes a scan process of reading a document.

Moreover, the MFP 52 also has a structure similar to the MFP 51. However, in order to simplify the figures, the MFP 52 is omitted in FIG. 1. Further, the type of communication interface with which the MFP 51 is provided, and the type of communication interface with which the MFP 52 is provided may be different.

(Processes Performed by CPU 106 of Information Processing Device 100)

Processes performed by the CPU 106 of the information processing device 100 of the present embodiment will be described with reference to FIG. 2 to FIG. 5. The flow of FIG. 2 starts in response to the user operating the touch panel 103 to start the print application 121.

In S120, the print application 121 determines whether the input of a setting instruction of the connection setting has been received. The determination may be performed according to whether a setting button displayed by the display means 102 has been tapped. If a negative determination is made (S120: NO), the process returns to S120, and if a positive determination is made (S120: YES), the process proceeds to S130.

In S130, the print application 121 receives the input of search information for searching for a print device which will be made to execute printing. Examples of the information included in the search information are device classification identification information, device type identification information, communication method identification information, etc. It is sufficient for at least one example of this information to be included in the search information. The device classification identification information is information for identifying a classification of the print device. The classification divides print devices into a plurality of groups depending on function. For example, the classification may divide the print devices into print devices using printing paper, and print devices using tape. The device type identification information is information identifying the type of print device. For example, the device type identification information may be a model name. The communication method identification information is information for identifying a method to perform communication with a print device. For example, the communication method identification information is infrastructure mode wireless communication or bluetooth protocol wireless communication.

In S135, the print application 121 sets the inputted search information in an intent. Thereby, it is possible to pass the search information to the connection module 122 via the intent. In S137, the print application 121 starts the connection module 122. The operation contents of the connection module 122 will be described later.

In S140, the print application 121 determines whether reply information has been received from the connection module 122 via the intent. If a negative determination is made (S140: NO), the process returns to S140, and if a positive determination is made (S140: YES), the process proceeds to S145. In S145, the print application 121 determines the contents of the reply information. If the contents of the reply information are connection information (S800) (S145: connection information), the process proceeds to S150.

In S150, the print application 121 establishes a communication with the MFP 51 based on the connection information. In S170, the print application 121 generates print data. The print data may be read from the storage unit 109.

In S175, the print application 121 sends the print data to the MFP 51 via the communication path established in S150. Then, the print application 121 ends. Further, the MFP 51 causes the printer 19 to print the received print data.

On the other hand, if it is determined in S145 that the contents of the reply information are the device type information (S830) (S145: device type information), the process proceeds to S180. In S180, the print application 121 generates print data compatible with the type of print device indicated by the device type information. Thereby, print data compatible with the type of print device can be generated even if the type of print media (e.g., printing paper, tape) and size (e.g., A3 size, A4 size) that can be used differs depending on the type of print device. In S185, the print application 121 stores the generated print data in the storage unit 109. Then, the print application 121 ends.

(Operation of Connection Module 122)

Figure 3:
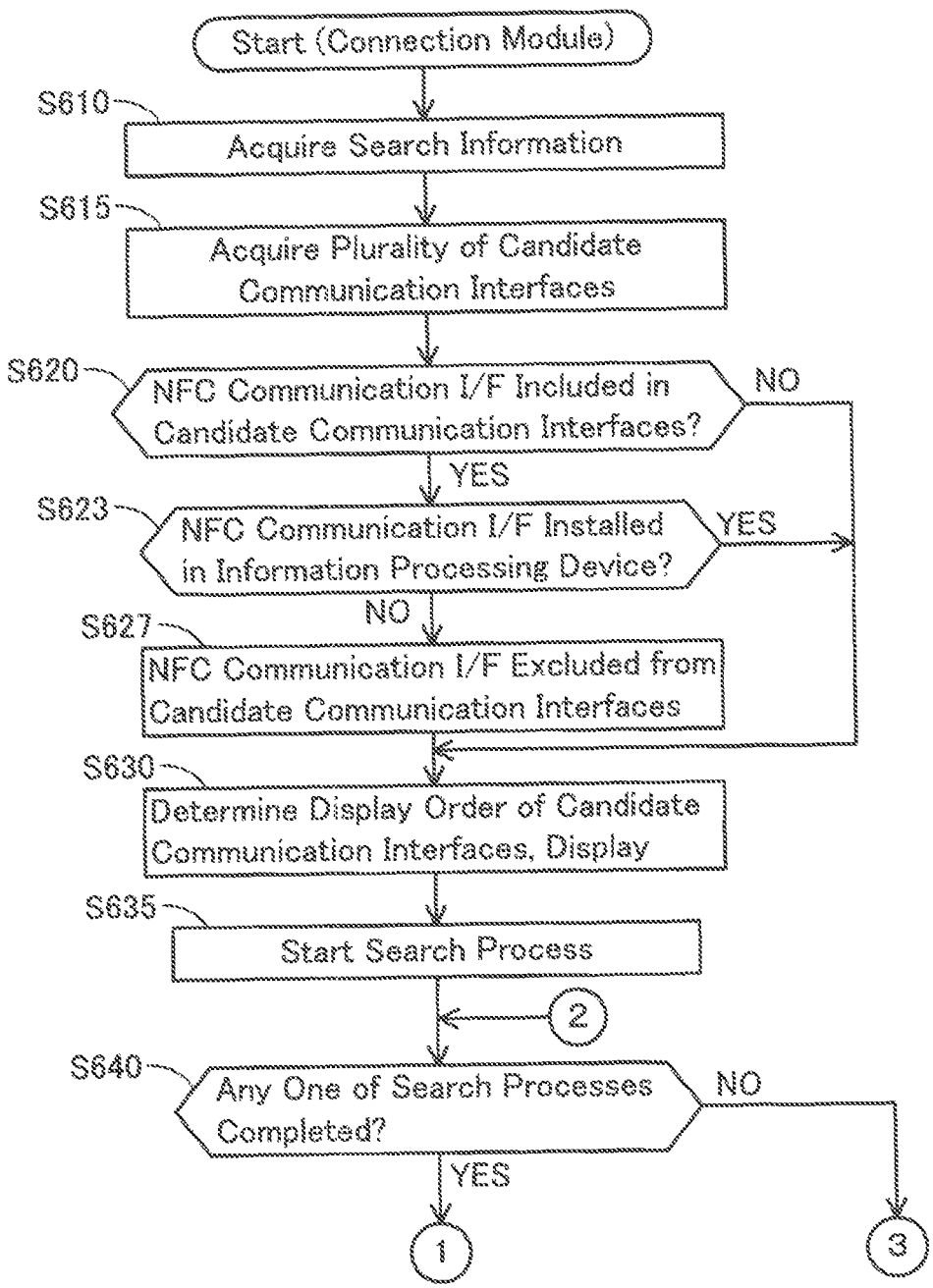
Figure 4:
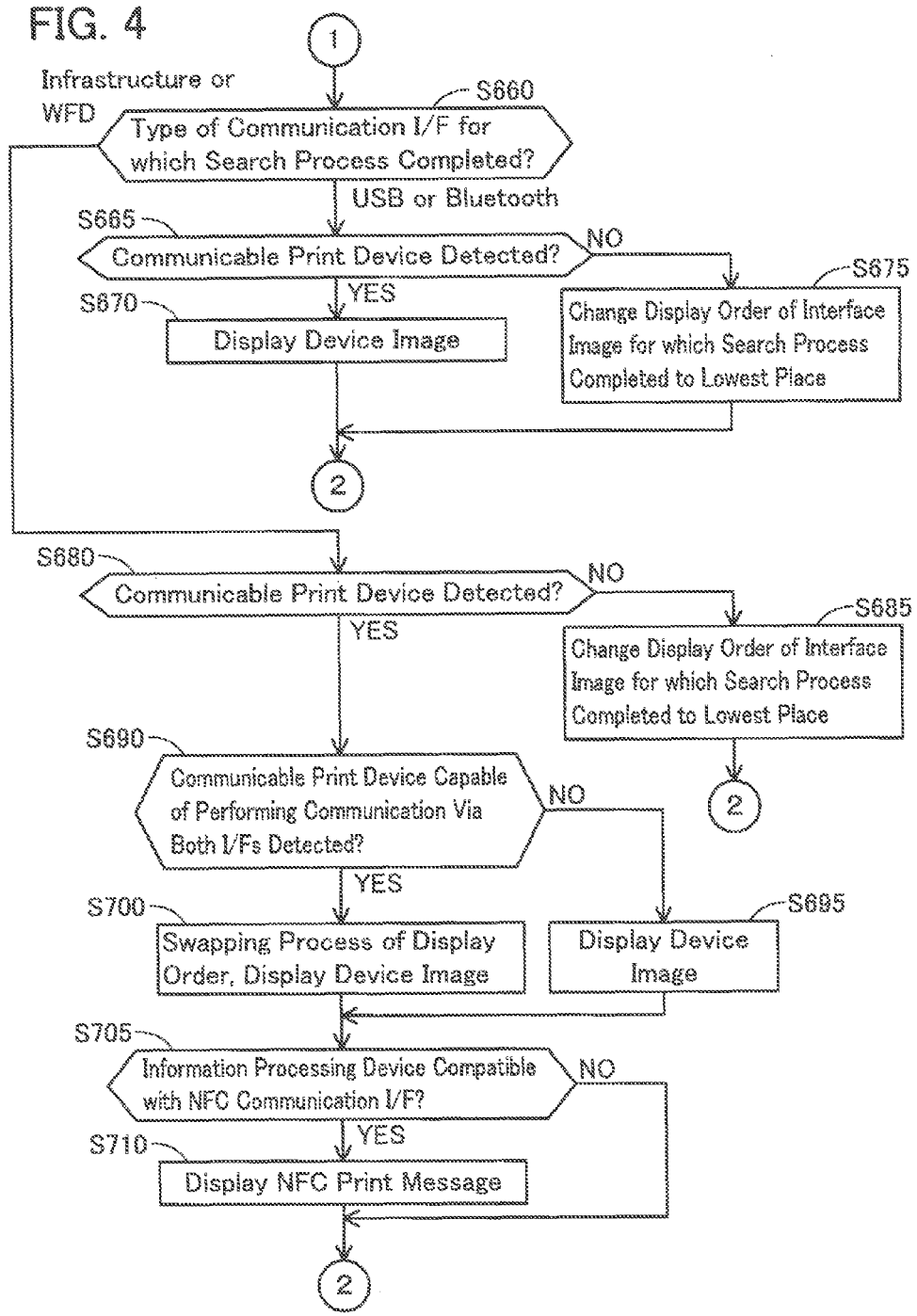
Figure 5:
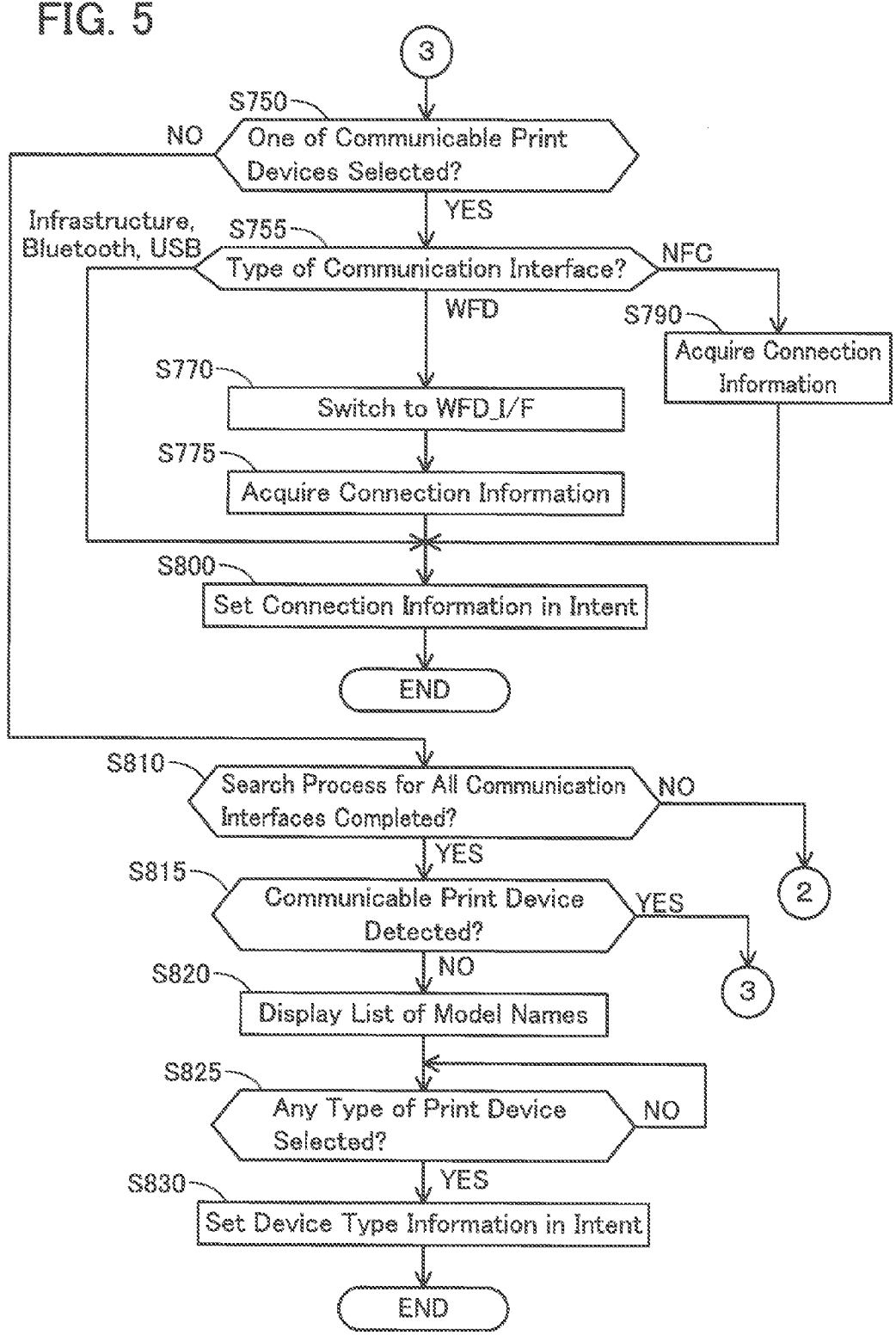

Operation of the connection module 122 started in S137 will be described using FIG. 3 to FIG. 5. In S610, the connection module 122 acquires, via the intent, the search information notified by the print application 121 in S135.

In S615, the connection module 122 acquires a plurality of candidate communication interfaces. The candidate communication interface is a communication interface that can be used to communicate the print data. The candidate communication interface may be any of e.g., infrastructure mode wireless LAN_I/F, WFD_I/F, bluetooth communication I/F, USB_I/F, and NFC I/F.

A specific example of the method of acquiring the candidate communication interface will be described. The connection module 122 identifies the type of print device for which the device classification identification information, the device type identification information, and the communication method identification information included in the search information meets the AND condition. Then, it is determined using the print device database 125 whether the identified type of print device is provided with any of the infrastructure mode wireless LAN_I/F, WFD_I/F, bluetooth communication I/F, USB_I/F, or NFC I/F.

In the illustrative example of the present embodiment, the case will be described in which the MFP 51 device type is identified based on the search information. The MFP 51 is provided with the wireless LAN_IN 34, the NFC I/F 36, the bluetooth communication I/F 40, and the USB_I/F 41. Therefore, in S615, all of the infrastructure mode wireless LAN_I/F, WFD_I/F, bluetooth communication I/F, USB_I/F, and NFC I/F are acquired as the candidate communication interfaces.

In S620, the connection module 122 determines whether the NFC I/F is included in the plurality of candidate communication interfaces acquired in S615. If a negative determination is made (S620: NO), the process proceeds to S630, and if a positive determination is made (S620: YES), the process proceeds to S623. In S623, the connection module 122 determines whether the NFC I/F is installed in the information processing device 100. If a positive determination is made (S623: YES), the process proceeds to S630, and if a negative determination is made (S623: NO), the process proceeds to S627. In S627, the connection module 122 excludes the NFC I/F from the candidate communication interfaces. Then, the process proceeds to S630.

In S630, the connection module 122 determines a display order of the plurality of candidate communication interfaces. Then, the display means 102 is caused to display a communication interface selection screen 200.

FIG. 6 shows a screen example of the communication interface selection screen 200. FIG. 6 is a screen example of the case where the infrastructure mode wireless LAN_I/F, the WFD_I/F, the bluetooth communication I/F, and the USB_I/F have been acquired as the candidate communication interfaces. Interface images 211 to 213 are displayed on the communication interface selection screen 200. The interface image 211 is an image indicating the USB_I/F. The interface image 212 is an image indicating the bluetooth communication I/F. The interface image 213 is an image indicating the infrastructure mode wireless LAN_I/F and the WFD_I/F.

The interface images 211 to 213 are displayed following a specific display order, in which the higher the image in the display order, the higher the priority. Specifically, the higher the interface image in the display order, the further it is displayed to the upper side of the screen. That is, the specific display order is: the interface image 211 in first place, the interface image 212 in second place, and the interface image 213 in third place. Moreover, the specific display order may be determined in advance.

In S635, the connection module 122 starts a search process to search for a communicable print device, which is a print device capable of communication. Specifically, an overlapping communication interface that qualifies both as (overlaps as) being one of the plurality of candidate communication interfaces acquired in S615 and one of the plurality of communication interfaces provided in the information processing device 100 is identified. Then, the search process is executed in parallel for each of the identified communication interfaces.

In the descriptive example of the present embodiment, the case is described in which the infrastructure mode wireless LAN_I/F, the WFD_I/F, the bluetooth communication I/F, the USB_I/F, and the NFC I/F are acquired in S615. Further, the information processing device 100 is provided with the wireless LAN_I/F 105, the bluetooth communication I/F 113, and the USB_I/F 114. Consequently, the infrastructure mode wireless LAN_I/F, the WFD_I/F, the bluetooth communication I/F, and the USB_I/F are identified as the overlapping communication interfaces.

In S640, the connection module 122 determines whether any one search process has been completed among the plurality of search processes being executed in parallel. If a positive determination is made (S640: YES), the process proceeds to S660.

In S660, the connection module 122 determines the type of communication interface for which the search process has been completed. If it is determined that the communication interface for which the search process has been completed is the USB_I/F or the bluetooth communication I/F (S660: USB or bluetooth), the process proceeds to S665. In S665, the connection module 122 determines whether communicable print device has been detected by the search process. If a positive determination is made (S665: YES), the process proceeds to S670. In S670, the connection module 122 causes the display means 102 to display a device image indicating the communicable print device detected in S665.

A specific example of the display method of the device image in S670 will be described. As an example, a case will be described in which a screen shifts from the communication interface selection screen 200 of FIG. 6 to a communication interface selection screen 201 of FIG. 7. The communication interface selection screen 200 of FIG. 6 is a screen in an incomplete state of the search process for all three communication interfaces identified by the interface images 211 to 213. The communication interface selection screen 201 of FIG. 7 is a screen of an initial search process completed state for the bluetooth communication I/F identified by the interface image 212.

The connection module 122 executes a swapping process of the display order of the interface images. The swapping process of the display order of the interface images is a process to change the display order of an interface image indicating a communication interface for which the search process has been completed (corresponding to the interface image 212 in this illustrative example) to a higher order than that of an interface image of a communication interface for which the search process has not yet been completed (corresponding to the interface images 211 and 213 in this illustrative example), so as to form an order following the specific display order described above. In the illustrative example of FIG. 7, the changed display order is: the interface image 212 in first place, the interface image 211 in second place, and the interface image 213 in third place. Then, the connection module 122 displays the interface images according to the changed display order. Thereby, the interface images 211 to 213 are rearranged from the communication interface selection screen 200 of FIG. 6 to the communication interface selection screen 201 of FIG. 7.

Further, the connection module 122 causes the display means 102 to display a device image indicating a communicable print device detected by the search process (corresponding to a device image 241 in this illustrative example) so as to be arranged in alignment with the interface image for which the search process has been currently completed (corresponding to the interface image 212 in this illustrative example) (see FIG. 7). Then, the process returns to S640. By displaying the device image and the interface image in alignment, it is possible to display the device image and the interface image in association. The device image 241 includes a device name 242 and a MAC address 243. The device name 242 is information indicating the communicable print device. The MAC address 243 is information for identifying the communicable print device that has the device name 242.

On the other hand, if a negative determination is made in S665 (S665: NO), the process proceeds to S675. In S675, the connection module 122 changes the display order of the interface image for which the search process has been completed to the lowest place.

Figure 8:
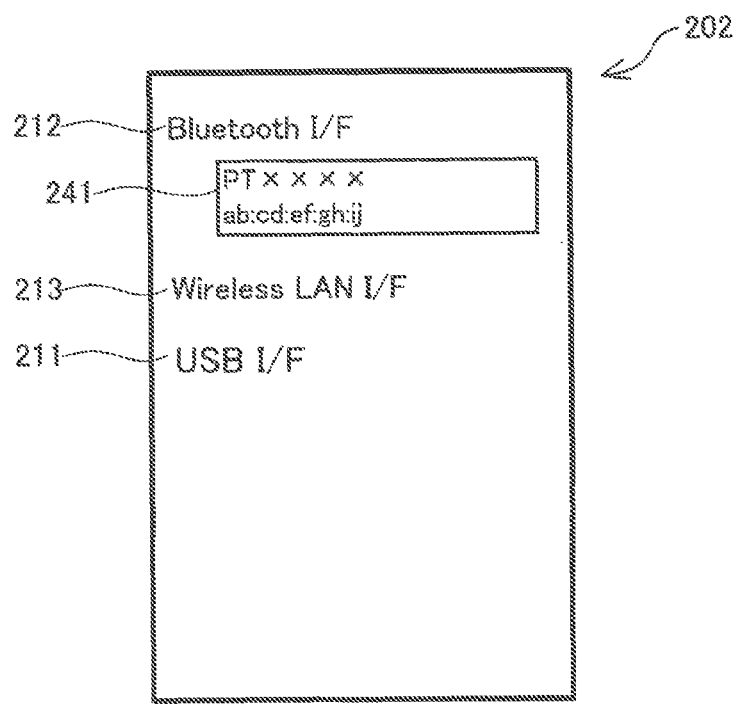

A specific example of the display method of the device image in S675 will be described. As an example, a case will be described in which the screen shifts from the communication interface selection screen 201 of FIG. 7 to a communication interface selection screen 202 of FIG. 8. The communication interface selection screen 202 of FIG. 8 is a screen of a state of an initial search process for the bluetooth communication I/F having been completed, and a next search process for the USB_I/F having been completed. Further, the communication interface selection screen 202 is a screen of a state of not having detected a communicable print device for the USB_I/F.

The connection module 122 changes the display order of the interface image indicating an interface for which the search process has been completed, and for which a communicable print device could not be detected (corresponding to the interface image 211 in this illustrative example) to the lowest place. The changed display order is: the interface image 212 in first place, the interface image 213 in second place, and the interface image 211 in third place. Then, the interface images are displayed according to the changed display order. Thereby, the interface images 211 to 213 are rearranged from the communication interface selection screen 201 of FIG. 7 to the communication interface selection screen 202 of FIG. 8. Then, the process returns to S640.

Further, if it is determined in S660 that the communication interface for which the search process has been completed is the infrastructure mode wireless LAN_I/F or WFD_I/F (S660: infrastructure or WFD), the process proceeds to S680. In S680, the connection module 122 determines whether a communicable print device has been detected by the search process. If a negative determination is made (S680: NO), the process proceeds to S685. In S685, the connection module 122 changes the display order of the interface image indicating the interface for which the search process has been completed and for which a communicable print device could not be detected, to the lowest place. Moreover, since the process contents of S685 are the same as the process contents of S675, described above, a description thereof is omitted here.

On the other hand, if a positive determination is made in S680 (S680: YES), the process proceeds to S690. In S690, the connection module 122 determines whether a communicable print device has been detected that is capable of performing both a wireless communication via the infrastructure mode wireless LAN_I/F and a wireless communication via the WFD_I/F. A specific example of the determination method will be described. If a first print device capable of communicating using the WFD_I/F is present, the connection module 122 receives a BSSID (abbreviation of Basic Service Set Identifier) from the first print device. Information for identifying a first MAC address, which is a unique physical address for identifying the first print device, is included in the BSSID. The information for identifying the first MAC address may be the first MAC address itself, or may be information related to the first MAC address. An example of information related to the first MAC address is information in which specific bits of the first MAC address have been inverted. Further, if a second print device capable of communicating using the infrastructure mode wireless LAN_I/F is present, the connection module 122 receives, from the second print device, a second MAC address for identifying the second print device. Then, if the first MAC address included in the BSSID and the second MAC address are matching, it is determined that the first print device and the second print device are the same print device, and that it is a print device capable of performing both a wireless communication via the infrastructure mode wireless LAN_I/F and a wireless communication via the WFD_I/F.

If a positive determination is made in S690 (S690: YES), the process proceeds to S700. In S700, the connection module 122 executes the swapping process of the display order of the interface images. Since the contents of that process have already been described in S670, a description thereof is omitted here. Further, the connection module 122 causes the display means 102 to display a device image indicating the communicable print device detected in S680.

A specific example of the display method of the device image in S700 will be described. As an example, a case will be described in which the screen shifts from the communication interface selection screen 202 of FIG. 8 to a communication interface selection screen 203 of FIG. 9. The communication interface selection screen 203 of FIG. 9 is a screen of a state in which, after a search process for the bluetooth communication I/F and the USB_I/F has been completed, a search process for the infrastructure mode wireless LAN_I/F and the WFD_I/F has been completed.

Figure 9:
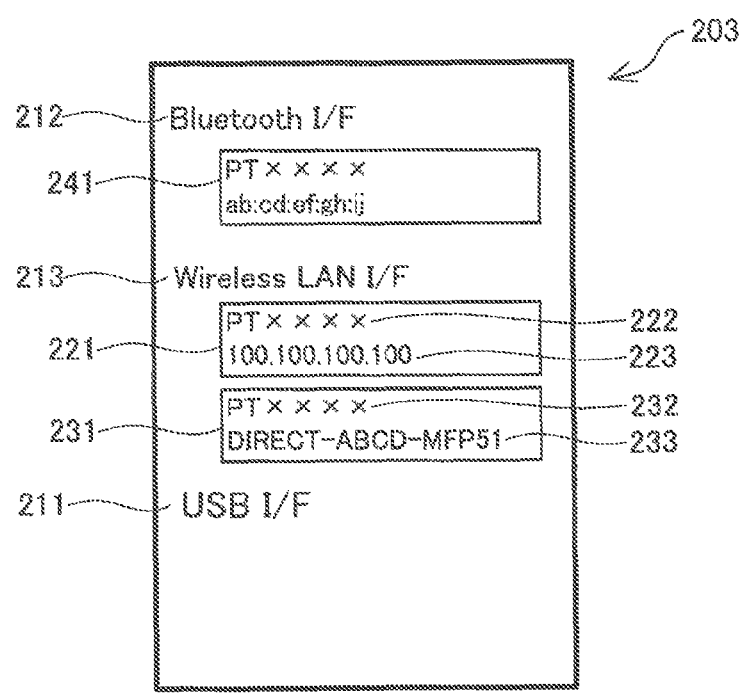

The connection module 122 displays, on the display means 102, a device image indicating the communicable print device detected by the search process (corresponding to device images 221 and 231 in this illustrative example) arranged in alignment with the interface image for which the search process has been currently completed (corresponding to the interface image 213 in this illustrative example) (see FIG. 9). The device image 221 includes a device name 222 and an IP address 223. The device name 222 is information indicating the communicable print device. The IP address 223 is information indicating that the communicable print device having the device name 222 is capable of performing a wireless communication via the infrastructure mode wireless LAN_I/F. The device image 231 includes a device name 232 and an SSID 233. The device name 232 is information indicating the communicable print device. The SSID 233 is information indicating that the communicable print device having the device name 232 is capable of performing a wireless communication via the WFD_I/F.

Further, the device image 221 indicating the device capable of communication via the infrastructure mode wireless LAN_I/F is displayed in the communication interface selection screen 203 above (i.e. in priority to) the device image 231 indicating the device capable of communication via the WFD_I/F. Further, the plurality of device images 221, 231, 241, and the plurality of interface images 211 to 213 are displayed in one display screen in the communication interface selection screen 203.

On the other hand, if a negative determination is made in S690 (S690: NO), the process proceeds to S695. In S695, the connection module 122 causes the display means 102 to display a device image indicating the communicable print device detected in S680. Moreover, the contents of the process of S695 are the same as the contents of the process of S670, described above, and consequently a description thereof is omitted here. Then, the process proceeds to S705.

In S705, the connection module 122 determines whether the information processing device 100 is compatible with the NFC I/F. The determination contents of S705 may be the same as the determination contents of S623, described above. If a negative determination is made (S705: NO), the process returns to S640, and if a positive determination is made (S705: YES), the process proceeds to S710.

Figure 10:
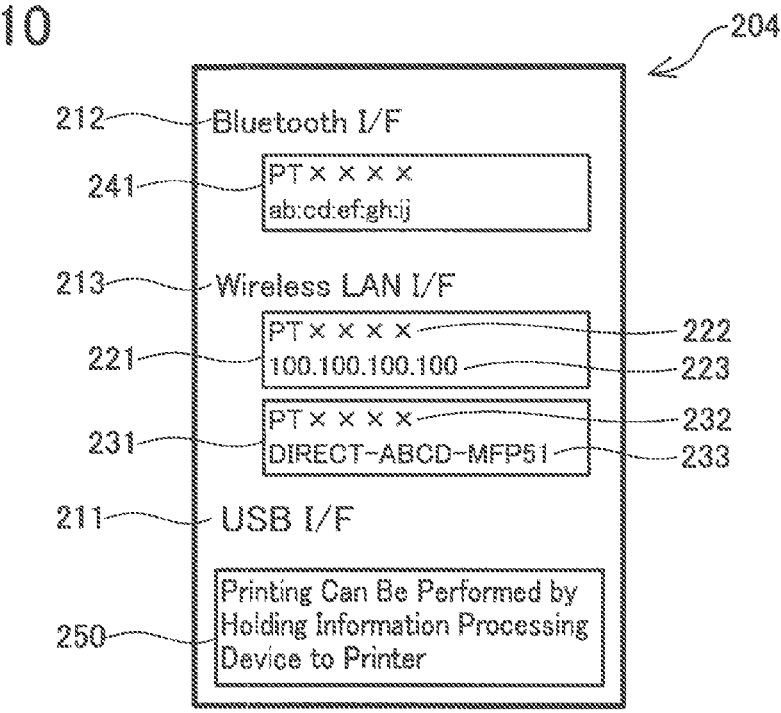

In S710, the connection module 122 displays an NFC print message 250, as shown in a communication interface selection screen 204 of FIG. 10. The NFC print message 250 is an image indicating that it is possible to execute a print process by NFC. The print process by NFC is a process to cause the MFP 51 to perform a print by bringing the information processing device 100 close to the MFP 51. Specifically, it is possible to perform wireless communications 151 and 154 using the wireless LAN_I/F by communicating a wireless setting via the wireless communication 153 using the NFC I/F. Then, the print data can be sent to the MFP 51 via the wireless communications 151 and 154, and the MFP 51 can be caused to execute a print. Moreover, a description of detailed contents of the print process by NFC is omitted here.

On the other hand, if a negative determination is made in S640 (S640: NO), the process proceeds to S750. In S750, the connection module 122 determines whether an operation has been inputted to select one of the communicable print devices as the communication destination of the print data. The determination may be performed according to whether any device image displayed in the communication interface selection screen has been tapped. If a positive determination is made (S750: YES), the process proceeds to S755.

In S755, the connection module 122 determines the type of communication interface used in communication with the selected communicable print device. The determination may be performed by determining the type of communication interface associated with the device image tapped in S750. If it is determined that the infrastructure mode wireless LAN_I/F, the bluetooth communication I/F, or the USB_I/F will be used (S755: infrastructure, bluetooth or USB), the process proceeds to S800.

On the other hand, if it is determined that the WFD_I/F will be used (S755: WFD), the process proceeds to S770. In S770, the connection module 122 switches the wireless LAN_I/F 105 from a state functioning as the infrastructure mode wireless LAN_I/F to a state functioning as the WFD_I/F. In S775, the connection module 122 acquires connection information for performing a WFD protocol wireless communication 155. Examples of connection information for performing the WFD protocol wireless communication 155 are an SSID, encryption method, password, etc. of the WFD network. The encryption method and password are information for performing device authentication, data encryption, etc. in the WFD network. Then, the process proceeds to S800.

Further, if it is determined in S755 that the NFC I/F will be used (S755: NFC), the process proceeds to S790. In S790, the connection module 122 acquires, via the wireless communication 153 using the NFC I/F, connection information from the MFP 51 for performing the wireless communications 151 and 154 using the wireless LAN_I/F. An example of this type of connection information is the IP address, etc. of the MFP 51.

In S800, the connection module 122 sets the connection information in an intent. Then, the flow is ended. Thereby, the connection information can be passed to the print application 121 via the intent. If the infrastructure mode wireless LAN_I/F will be used, the SSID of the first access point 501 and the IP address of the MFP 51 may be included in the connection information. If the bluetooth communication I/F will be used, the MAC address may be included in the connection information. If the WFD_I/F will be used, the connection information acquired in S775 may be set in an intent. If the NFC I/F will be used, the connection information acquired in S790 may be set in an intent.

On the other hand, if a negative determination is made in S750 (S750: NO), the process proceeds to S810. In S810, the connection module 122 determines whether the search process has been completed for all of the plurality of communication interfaces. If a negative determination is made (S810: NO), the process returns to S640, and if a positive determination is made (S810: YES), the process proceeds to S815.

In S815, the connection module 122 determines whether a communicable print device has been detected. If a positive determination is made (S815: YES), the process returns to S750, and if a negative determination is made (S815: NO), the process proceeds to S820.

In S820, the connection module 122 displays a list in the display means 102 of information for identifying all types of print device compatible with the print application 121. An example of the information for identifying the type of print device is the model name.

In S825, the connection module 122 determines whether an operation has been inputted to select any type of print device. The determination may be performed according to whether any model name listed in the display means 102 has been tapped. If a negative determination is made (S825: NO), the process returns to S825, and if a positive determination is made (S825: YES), the process proceeds to S830.

In S830, the connection module 122 sets device type information indicating the type of print device that was selected in the intent. Then, the flow is ended.

(Advantages)

As shown in the display example of the communication interface selection screen 203 of FIG. 9, it is possible to cause the display means 102 to display, in association with one another, the device images 221 and 231 indicating the communicable print devices, and the interface image 213 indicating the wireless LAN_I/F compatible with the detected communicable print device. Thereby, the combination of the communicable print device and the available communication interface can be made known to the user. Therefore, it is possible to cause the user to appropriately perform a communication between the information processing device 100 and the print device.

Further, as shown in the display example of the communication interface selection screen 203 of FIG. 9, it is possible to display the device images 221, 231, 241 indicating the plurality of communicable print devices, and the plurality of interface images 211 to 213 within one display screen. Thereby, since it is not necessary to switch the display screen, operability when selecting the print device can be improved.

It is possible to search a communicable print device for the communication interface that qualifies both as (overlaps as) being one of the plurality of candidate communication interfaces detected in S615, and one of the plurality of communication interfaces with which the information processing device 100 is provided (S635). Thereby, since it is possible to perform a search process only for the available communication interface, the time for the search process can be shortened.

Wireless communication via the infrastructure mode wireless LAN_I/F is often more advantageous than wireless communication via the WFD_I/F from the viewpoint of power consumption, number of circuits that can be communicated simultaneously, etc. According to the connection module 122 described in the present specification, if a communicable print device is detected that is capable of performing both wireless communication via the infrastructure mode wireless LAN_I/F and wireless communication via the WFD_I/F (S690: YES), the device image 221 indicating the device capable of communication via the infrastructure mode wireless LAN_I/F can be displayed higher than (i.e. in priority to) the device image 231 indicating the device capable of communication via the WFD_I/F, as shown in the screen example of the communication interface selection screen 203 of FIG. 9. Thereby, it is possible to cause the user to preferentially select the more appropriate communication interface from among the plurality of communication interfaces.

As shown in the screen example of the communication interface selection screen 203 of FIG. 9, the IP address 223 of the communicable print device can be displayed in association with the device image 221 associated with the infrastructure mode wireless LAN_I/F. Thereby, it is possible to make the user recognize that the communicable print device having the device name 222 is capable of performing wireless communication via the infrastructure mode wireless LAN_I/F. Further, the SSID 233 can be displayed in association with the device image 231 associated with the WFD_I/F. Thereby, it is possible to make the user recognize that the communicable print device having the device name 232 is capable of performing wireless communication via the WFD_I/F.

The connection module 122 receives the BSSID and the MAC address from the print device (S690). Then, if the MAC address acquired from the BSSID and the received MAC address match, it is possible to determine that a print device exists that is capable of performing both wireless communication via the infrastructure mode wireless LAN_I/F and wireless communication via the WFD_I/F.

As shown in the screen example of the communication interface selection screen 200 of FIG. 6, it is possible to display the list of interface images 211 to 213 before starting the search for a communicable print device. Then, in response to a communicable print device being detected for any communication interface indicated by the interface images 211 to 213 (S640: YES), it is possible to cause a device image to be additionally displayed. For example, if a communicable print device for the bluetooth communication I/F indicated by the interface image 212 is detected, the communication interface selection screen shifts from FIG. 6 to FIG. 7, and the device image 241 is additionally displayed. Next, if a communicable print device for the interface image 213 is detected, the communication interface selection screen shifts from FIG. 8 to FIG. 9, and the device images 221 and 231 are additionally displayed. Thereby, in case the search process for communicable print devices is executed in parallel for the plurality of communication interfaces (S635), it is possible to display the search results each time the search process is completed. Therefore, waiting time until the search results are displayed can be shortened compared to the case of displaying the search results in response to completion of the search process for all of the plurality of communication interfaces. Therefore convenience to the user can be increased.

If device images indicating detected communicable print devices are displayed (S670, 5695, S700), a swapping process of the display order of the interface images can be executed. Thereby, e.g., as can be understood from the shifting state of the communication interface selection screen from FIG. 6 to FIG. 7, the display order of the interface image 212 indicating the bluetooth communication I/F for which the search process has been completed can be swapped to a higher order than the interface image 211 of the USB_I/F for which the search process has not yet been completed. Consequently, the display means 102 can be caused to preferentially display the detected communication interfaces of the communicable print devices.

In case the NFC I/F is included in the plurality of candidate communication interfaces detected in S615 (S620: YES), if the NFC I/F is installed in the information processing device 100 (S623: YES), the display means 102 can be caused to display the NFC print message 250 (see S710, FIG. 10). Thereby, the user can be notified that a communication with the print device by the operation of bringing the information processing device 100 close to the print device is possible only in the case where the condition is satisfied that the NFC protocol wireless communication 153 is available.

If a communicable print device could not be detected (S815: NO), a list of information for identifying all the types of print device compatible with the print application 121 can be displayed (S820). Then, in response to the selection of any type of print device (S825: YES), the selected type of print device can be notified from the connection module 122 to the print application 121 (S830). Thereby, the print application 121 can generate print data compatible with the selected type of print device (S180).

The connection module 122 can be started by being called by the print application 121, which is a higher-level application (S137). Then, the connection module 122 can execute a wireless communication connection process (S610 to S830), and return connection information, used for establishing a wireless communication, to the print application 121 (S800). Thereby, since the connection module 122 can be shared by a plurality of higher-level applications, the functions of the higher-level applications can be simplified.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

(Modifications)

Figure 11:
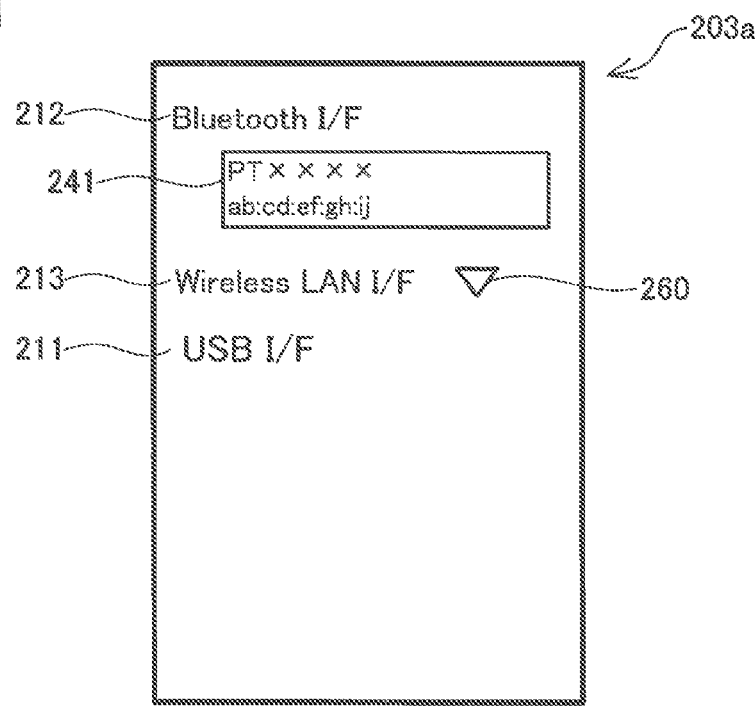

The display form may vary when displaying the interface images higher in the display order by priority. For example, as shown in the display example of a communication interface selection screen 203a of FIG. 11, the device image 241 corresponding to the interface image 212 may be displayed in an expanded state. Further, the device images 221 and 231 corresponding to the interface image 213, which are lower in priority than the interface image 212, may be in a collapsed state (i.e. a non-display state). Further, an expansion button image 260, for receiving the input of an instruction to expand (i.e. to display) the collapsed image may be displayed aside the interface image 213. When the expansion button image 260 is tapped, the communication interface selection screen may shift from FIG. 11 to FIG. 9. Thereby, the user can be caused to preferentially select the more appropriate device image from among the plurality of device images.

The interface image indicating the infrastructure mode wireless LAN_I/F and the interface image indicating the WFD_I/F may be displayed as separate images. In this case, if a print device is detected that is capable of communication by the infrastructure mode wireless LAN_I/F and the WFD_I/F, the interface image indicating the infrastructure mode wireless LAN_I/F, the device image indicating the print device capable of communication by the infrastructure mode wireless LAN_I/F, the interface image indicating the WFD_I/F, and the device image indicating the print device capable of communication by the WFD_I/F may be displayed in alignment.

The display method of the device image indicating the print device capable of communication by the infrastructure mode wireless LAN_I/F and the WFD_I/F is not limited to the method shown in FIG. 9. If print devices are detected that are capable of communication by the infrastructure mode wireless LAN_I/F and the WFD_I/F, the display means 102 may be caused to display only the device image indicating the print device capable of communication by the infrastructure mode wireless LAN_I/F. Further, if the detected number of print devices capable of communication by the infrastructure mode wireless LAN_I/F and the WFD_I/F exceeds a predetermined specific number, the display means 102 may be caused to display only the device image indicating the print device capable of communication by the infrastructure mode wireless LAN_I/F.

The detection method of the candidate communication interface in S615 is not limited to the method using the print device database 125. For example, if the size of the print data handled by the print application 121 exceeds a predetermined specific size, the bluetooth communication I/F may be excluded from the candidate communication interface. The size of the print data may be notified via an intent from the print application 121 to the connection module 122.

Since the speed of a communication using a bluetooth communication I/F is often slower than the speed of a communication using a wireless LAN_I/F, a situation in which communication of the print data takes a long time can be avoided.

The specific display order may be changed dynamically. For example, the display order of the interface image indicating the USB_I/F may be set higher in a case where the USB cable 157 is connected to the USB_I/F 114 than in a case where the USB cable 157 is not connected to the USB_I/F 114. Further, e.g., the display order of the interface image indicating the bluetooth communication I/F may be set higher in a case where the pairing of the bluetooth communication I/F has been set than in a case where the pairing has not been set.

In the present embodiment, the description was given using the MFP 51 as an example of the "communication device" that communicates with the information processing device 100. However, the case is not limited to this configuration. The "communication device" may be a label printer, scanner, copier, portable terminal, PC, server, etc.

The information processing device 100 may have a configuration connectable with an external memory such as a memory card. Then, the configuration may be such that various data is stored in the external memory instead of the storage unit 109.

In the embodiment described above, the CPU 106 of the information processing device 100 realizes the processes of FIG. 2 to FIG. 5 by executing the program 120 (i.e., software) within the storage unit 109. Instead, at least one of the processes of FIG. 2 to FIG. 5 may be realized by hardware such as a logic circuit.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

The invention claimed is:

1. A non-transitory computer-readable storage medium storing instructions for an information processing device, the information processing device comprising:
K types of information processing device communication interfaces configured to communicate with a plurality of communication devices having different device types and configured to use K types of communication protocols, K being an integer greater than or equal to two;
a storage unit storing a database, the database storing, for each device type of the communication device, communication device communication interfaces that can be used by a corresponding device type of the communication device;
a display unit; and
a processor coupled to the K types of information processing device communication interfaces,
wherein the instructions, when executed by the processor, cause the information processing device to perform:
receiving a device type of a target communication device that is to be searched; determining the target communication device having the received device type; obtaining, based on the database, L types of candidate communication device communication interfaces that can be used by the target communication device, L being an integer greater than or equal to two;
determining M types of overlapping communication interfaces that are included both in the L types of candidate communication device communication interfaces and in the K types of information processing device communication interfaces, M being an integer greater than or equal to two, less than or equal to K, and less than or equal to L;
searching for, from among the M types of overlapping communication interfaces, a communicable interface that can perform a communication between the information processing device and the target communication device; and
displaying, in a case that the communicable interface is detected by the searching, a device image corresponding to a communicable communication device and an interface image corresponding to the communicable communication device in one display screen on the display unit,
the communicable communication device being a communication device that comprises the detected communicable interface,
the device image indicating the communicable communication device, and the interface image indicating the communication device communication interface corresponding to the communicable communication device,
wherein each device type includes at least one of device classification information, model classification information, and communication method information,
the device classification information being for identifying a type of print media available to a corresponding communication device,
the model classification information being for identifying a model of the corresponding communication device, and
the communication method information being for identifying a method to perform communication with the corresponding communication device,
wherein the determining of the target communication device includes determining a communication device that satisfies at least one condition included in the at least one of the device classification information, the model classification information and the communication method information included in the device type received in the receiving as the target communication device, and
wherein the displaying of the device image and the interface image, includes:
displaying, before the communicable communication device is detected by the searching, at least two interface images on the display unit in a display order in accordance with a predeterminedly set specific display order;
changing the display order of the interface image for which the device image is to be additionally displayed to be an order that is higher than an interface image of a communication device for which no communicable communication device has been detected and that complies with the specific display order, in the case of additionally displaying, on the display unit, the device image in association with the interface image of an information processing device communication interface for which the communicable communication device was detect; and displaying the at least two interface images on the display unit in the changed display order.

2. The non-transitory computer-readable storage medium according to claim 1, wherein
the searching includes searching for the communicable interfaces in parallel for the M types of overlapping communication interfaces, and
the displaying includes displaying, in response to the communicable interface being detected in the searching, the device image and the interface image that correspond to the detected communicable interface.

3. The non-transitory computer-readable storage medium according to claim 1, wherein
the K types of information processing device communication interfaces include:
a first communication interface configured to communicate with a communication device based on a wireless LAN standard without using a relay device; and
a second communication interface configured to communicate with a communication device based on the wireless LAN standard using the relay device, and
the displaying of the device image and the interface image includes displaying, in a case that a communicable communication device that can communicate with both the first communication interface and the second communication interface is detected by the searching, a device image associated with the second communication interface with higher priority than a device image associated with the first communication interface on the display unit.

4. The non-transitory computer-readable storage medium according to claim 3,
wherein
in the case that the communicable communication device that can communicate with both the first communication interface and the second communication interface is detected by the searching, the displaying of the device image and the interface image includes;
displaying, on the display unit, an IP address of the communicable communication device in association with the device image associated with the second communication interface;
and displaying, on the display unit, identifying information for identifying the first communication interface in association with the device image associated with the first communication interface.

5. The non-transitory computer-readable storage medium according to claim 3, wherein
the searching for the communicable communication device includes:
receiving interface identifying information for identifying the first communication interface from a first communication device, in a case that a first communication device that can communicate using the first communication interface is present, the interface identifying information including a first communication device physical address being a unique physical address for identifying the first communication device;
receiving a second communication device physical address being a unique physical address for identifying the second communication interface from a second communication device, in a case that a second communication device that can communicate using the second communication interface is present; and
determining that the first communication device and the second communication device are a same communication device that can communicate using both the first communication interlace and the second communication interface, in a case that the interface identifying information and the second communication device physical address are received, and the first communication device physical address included in the interface identifying information matches the second communication device physical address.

6. The non-transitory computer-readable storage medium according to claim 3,
wherein the displaying of the device image and the interface image includes:
displaying, in a case that a device image having a higher priority set is to be displayed on the display unit, the device image associated with the interface image on the display unit; and
displaying, on the display unit, in a case that a device image having a lower priority set is to be displayed on the display unit, an image for receiving an input of an instruction to display the device image associated with the interface image on the display unit.

7. The non-transitory computer-readable storage medium according to claim 3, wherein
a display screen displayed on the display unit includes a plurality of device images being aligned from a first direction side to a second direction, side, and
the displaying of the device image and the interface image includes displaying, in a case that a device image having a higher priority set is to be displayed on the display unit, the device image having the higher priority set on the first direction side.

8. The non-transitory computer-readable storage medium according to claim 1, wherein
the K types of information processing device communication interfaces include:
a first communication interface configured to communicate with a communication device based on a Near Field Communication (NFC) wireless communication protocol; and
a second communication interface configured to communicate with a communication device based on a wireless communication protocol different from the NFC wireless communication protocol, and
the displaying of the device image and the interface image includes displaying, on the display unit, information indicating that a communication using the second communication interface can be performed with a communication device that is a communication target, when a communication using the first communication interface is performed with the communication device that is the communication target.

9. The non-transitory computer-readable storage medium according to claim 8, wherein the displaying of the device image and the interface image includes displaying, in a case that the first communication interface is included in the one or more overlapping communication interfaces, on the display unit, information indicating that the communication using the second communication interface can be performed with the communication device that is the communication target in response to the communication using the first communication interface being performed with the communication device that is the communication target.

10. The non-transitory computer-readable storage medium according to claim 1, further stores specific instructions for the information processing device,
the instructions further cause the information processing device to perform storing communication performing information in a storage unit of the information processing device, the communication performing information being for performing a communication with the communicable communication device, and
the specific instructions, when executed by the processor, cause the information processing device to perform:
receiving the communication performing information stored in the storage unit; and
communicating, when one of the device images displayed on the display unit is selected, with the communicable communication device specified by the selected device image,
the communicating being performed based on the communication performing information and using an information processing device communication interface associated with the communicable communication device specified by the selected device image.

11. The non-transitory computer-readable storage medium according to claim 10, wherein
the instructions further cause the information processing device to perform:
displaying a list of a plurality of device types on the display unit in a case that no communicable communication device is detected in the searching; and
storing selected device type information in the storage unit when one of the plurality of device types displayed on the display unit is selected,
the specific instructions further cause the information processing device to perform:
receiving the selected device type information stored in the storage unit; and
generating data for causing the communication device, having the device type as identified by the selected device type information, to perform various processes.

12. The non-transitory computer-readable storage medium according to claim 10, wherein
a plurality of types of the specific instructions is present, and
the instructions are read by the processor when the instructions are called by one of the plurality of types of the specific instructions.

13. An information processing device comprising:
K types of information processing device communication interfaces configured to communicate with a plurality of communication devices having different device types and configured to use K types of communication protocols, K being an integer greater than or equal to two;
a storage unit storing a database, the database storing, for each device type of the communication device, communication device communication interfaces that can be used by a corresponding device type of the communication device;
a display unit; and
a processor coupled to the K types of information processing device communication interfaces, wherein the processor is configured to perform:
receiving a device type of a target communication device that is to be searched; determining the target communication device having the received device type; obtaining, based on the database, L types of candidate communication device communication interfaces that can be used by the target communication device, L being an integer greater than or equal to two;
determining M types of overlapping communication interfaces that are included both in the L types of candidate communication device communication interfaces and in the K types of information processing device communication interfaces, M being an integer greater than or equal to less than or equal to K, and less than or equal to L;
searching for, from among the M types of overlapping communication interfaces, a communicable interface that can perform a communication between the information processing device and the target communication device; and
displaying, in a case that the communicable interface is detected by the searching, a device image corresponding to a communicable communication device and an interface image corresponding to the communicable communication device in one display screen on the display unit,
the communicable communication device being a communication device that comprises the detected communicable interface,
the device image indicating the communicable communication device, and
the interface image indicating the communication device communication interface corresponding to the communicable communication device,
wherein each device type includes at least one of device classification information, model classification information, and communication method information,
the device classification information being for identifying a type of print media available to a corresponding communication device,
the model classification information being for identifying a model of the corresponding communication device, and
the communication method information being for identifying a method to perform communication with the corresponding communication device,
wherein the determining of the target communication device includes determining a communication device that satisfies at least one condition included in the at least one of the device classification information, the model classification information and the communication method information included in the device type received in the receiving as the target communication device, and
wherein the displaying of the device image and the interface image includes:
displaying, before the communicable communication device is detected by the searching, at least two interface images on the display unit in a display order in accordance with a predeterminedly set specific display order;
changing the play order of the interface image for which the device image is to be additionally displayed to be an order that is higher than an interface image of a communication device for which no communicable communication device has been detected and that complies with the specific display order, in the case of additionally displaying, on the display unit, the device image in association with the interface image of an information processing device communication interface for which the communicable communication device was detected; and displaying the at least two interface images on the display unit in the changed display order.

14. A method for controlling an information processing device, the information processing device comprising:

a display unit; and

K types of information processing device communication interfaces configured to communicate with a plurality of communication devices having different device types and configured to use K types of communication protocols, K being an integer greater than or equal to two; and a storage unit storing a database, the database storing, for each device type of the communication device, communication device communication interfaces that can be used by a corresponding device type of the communication device, the method comprising:

receiving a device type of a target communication device that is to be searched; determining the target communication device having the received device type; obtaining, based on the database, L types of candidate communication device communication interfaces that can be used by the target communication device, L being an integer greater than or equal to two;

determining M types of overlapping communication interfaces that are included both in the L types of candidate communication device communication interfaces and in the K types of information processing device communication interfaces, M being an integer greater than or equal to two, less than or equal to K, and less than or equal to L;

searching for, from among the M types of overlapping communication interfaces, a communicable interface that can perform a communication between the information processing device and the target communication device; and displaying, in a case that the communicable interface is detected by the searching, a device image corresponding to a communicable communication device and an interface image corresponding to the communicable communication device in one display screen on the display unit, the communicable communication device being a communication device that comprises the detected communicable interface, the device image indicating the communicable communication device, and the interface image indicating the communication device communication interface corresponding to the communicable communication device, wherein each device type at least one of includes device classification information, model classification information, and communication method information, the device classification information being for identifying a type of print media available to a corresponding communication device, the model classification information being for identifying a model of the corresponding communication device, and the communication method information being for identifying a method to perform communication with the corresponding communication device, wherein determining of the target communication device includes determining a communication device that satisfies at least one condition included in the at least one of the device classification information, the model classification information and the communication method information included in the device type received in the receiving as the target communication device, and wherein the displaying of the device image and the interface image includes:

displaying, before the communicable communication device is detected by the searching, at least two interface imaged on the display unit in a display order in accordance with a predeterminedly set specific display order;

changing the display order of the interface image for which the device image is to be additionally displayed to be an order that us higher than an interface image of a communication device for which no communicable communication device has been detected at that complies with the specific display order, in the case of additionally displaying, on the display unit, the device image in association with the interface image of an information processing device communication interface for which the communicable communication device was detected;

displaying the at least two interface images on the display unit in the changed display order.

* * * * *

UNITED STATES PATENT AND TRADEMARK OFFICE
CERTIFICATE OF CORRECTION

PATENT NO. : 9,961,150 B2
APPLICATION NO. : 14/584429
DATED : May 1, 2018
INVENTOR(S) : Katsura Banno It is certified that error appears in the above-identified patent and that said Letters Patent is hereby corrected as shown below:

In the Claims

In Column 16, Claim 1, Line 51:
Please delete "interface image, includes:" and insert --interface image includes:--

In Column 17, Claim 4, Line 39:
Please delete "image includes;" and insert --image includes:--

In Column 18, Claim 5, Line 4:
Please delete "first communication interlace" and insert --first communication interface--

In Column 18, Claim 7, Line 30:
Please delete "a second direction, side" and insert --a second direction side--

In Column 20, Claim 13, Line 10:
Please delete "equal to less than" and insert --equal to two, less than--

In Column 20, Claim 13, Line 60:
Please delete "the play order" and insert --the display order--

In Column 22, Claim 14, Line 6:
Please delete "at least one of includes" and insert --includes at least one of--

In Column 22, Claim 14, Line 20:
Please delete "wherein determining of" and insert --wherein the determining of--

In Column 22, Claim 14, Lines 31-32:
Please delete "at least two interface imaged" and insert --at least two interface images--

Signed and Sealed this
Sixteenth Day of October, 2018

Andrei Iancu
*Director of the United States Patent and Trademark Office*

CERTIFICATE OF CORRECTION (continued)
U.S. Pat. No. 9,961,150 B2

In Column 22, Claim 14, Line 37:
Please delete "that us higher than" and insert --that is higher than--

In Column 22, Claim 14, Line 39:
Please delete "has been detected at that" and insert --has been detected and that--

In Column 22, Claim 14, Line 45:
Please delete "device was detected;" and insert --device was detected; and--